J. H. MOORE.
Sulky-Plow.
No. 217,893. Patented July 29, 1879.
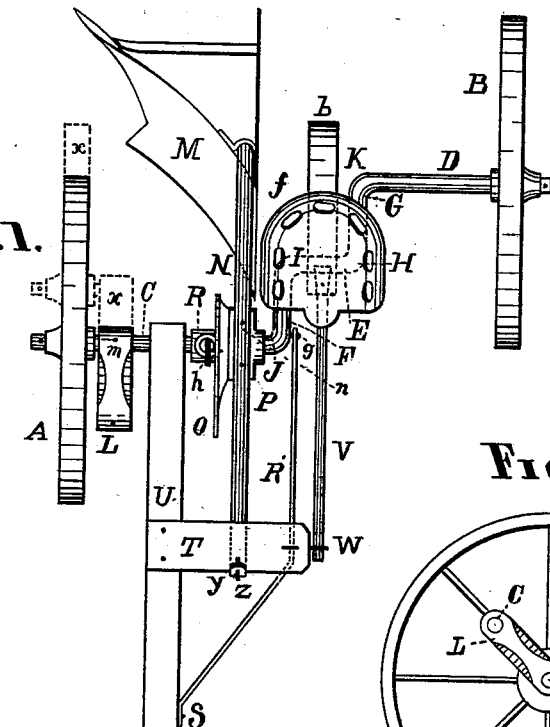
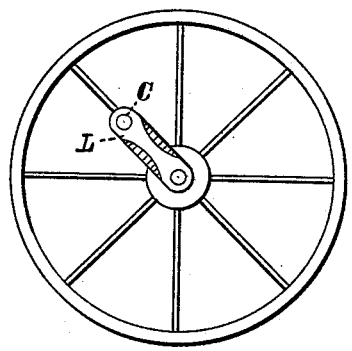
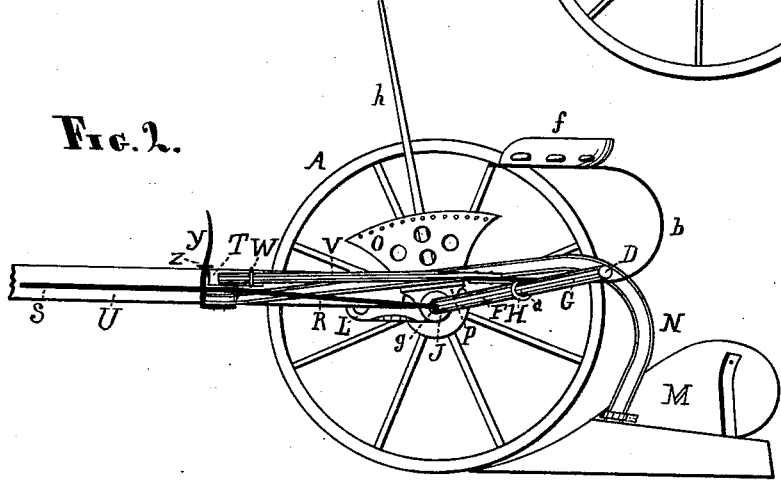
WITNESSES.
A. G. Morey
F. W. Fowler
INVENTOR.
Jesse H. Moore by
G. L. Chapin Atty

UNITED STATES PATENT OFFICE.

JESSE H. MOORE, OF ALEDO, ILLINOIS.

IMPROVEMENT IN SULKY-PLOWS.

Specification forming part of Letters Patent No. 217,893, dated July 29, 1879; application filed September 4, 1878.

*To all whom it may concern:*

Be it known that I, JESSE H. MOORE, of Aledo, in the county of Mercer and State of Illinois, have invented new and useful Improvements in Sulky-Plows, of which the following is a specification, reference being had to the annexed drawings, illustrating the same.

The present invention relates to improvements in that class of plows which are mounted on wheels and manipulated by an operator riding on the sulky.

The particular improvements consist, first, in a right-angular arm projecting from the spindle of the furrow-wheel, and having two bearings in it, either of which may be keyed to the axle-tree, one bearing being used when the plow is at work and the other being keyed to the axle-tree, that the plow may be carried above the ground; second, in the peculiar form of the axle-tree, it having four elbows, whereby the beam-seat has a bearing on the straight part of the axle-tree on the furrow side of the sulky, and the seat-spring has a bearing in which the middle of the axle-tree may turn, the spring having a support projecting to the front, and fastening to a cross-bar on the tongue. By this means the weight of the operator is balanced on the axle-tree.

In the drawings, Figure 1 is a plan or top view of a sulky-plow embodying my improvements. Fig. 2 is a side elevation thereof with the land-wheel removed; Fig. 3, an elevation of the furrow-wheel, showing the spindle-elbow in position, as when its forward bearing is keyed to the axle-tree.

A represents the furrow-wheel, and B the land-wheel, of the sulky. C is the forward part of the axle-tree; D, the rear part, and E the central part, thereof. F G are the parts that are parallel to the tongue, and complete the form of the elbows H I J K.

The spindle of the furrow-wheel A has an arm, L, projecting to the front, and having two bearings or sleeves therein suitable to receive the end C of the axle-tree.

When the plow M is in use, the axle-tree is placed in the rear bearing, and in position as shown in Fig. 1; but when the plow is to be carried from one field to another, the axle-tree at C is placed in the forward bearing, as shown in Fig. 3, and by dotted lines $x$, Fig. 1, and secured in place either by a pin, $m$, or a key of ordinary construction; but for turning round in a field, the plow can be raised high enough by bringing the lever $h$ back on the disk $o$. The change of bearings may be readily made when the plow M is on the ground, as there is no considerable weight on the wheel.

A beam-seat, P, is collared on that part of the axle-tree shown at C, so as to have a partial rotation, and by means of bolts $n$ or ordinary clips the plow-beam N is rigidly attached thereto.

In the drawings the ordinary bent iron beam is shown; but in case a wooden beam is to be used, the seat P should be inverted and placed below the axle-tree, and the top of the wooden beam secured to it by the same means as the iron beam. The forward end of the beam N may be elevated or depressed and held in any desired position by means of a strap, Y, and pin Z, put through it and into or above the cross-bar T. The tongue U is hung to the axle-tree by a bearing which will allow the axle-tree to turn therein, and it is strongly braced by a draft-rod, R', pivoted to the elbow J at $g$, and bolted to the tongue at S, and the inner end of the cross-bar T is attached thereto. By this means the tongue U, beam N, bar R', and support V have a simultaneous movement in the same plane, thereby properly directing the plow over undulating ground.

The disk O, by means of which the lever $h$ is held in place, is made rigid to the beam-seat P, and the lever may turn the axle-tree back or forth, and engage the disk O at such points as to hold the beam N at any desired height.

The seat-spring $b$ is hung to the middle, E, of the axle-tree, so that the latter may turn in the bearing of the spring. To hold the seat $f$ properly, a bar, V, made fast to the spring, extends forward and through an eye, W, driven into the bar T, said bar V having (in use) a longitudinal movement in the eye W, and the operator's weight is balanced so that he does not have to lift himself in turning the axle-tree by lever $h$ when putting the plow M to the required depth in the ground.

Having thus described my invention, what I claim, and desire to secure by Letters Patent, is—

1. The axle formed with a series of rightangled bends, forming the cross portions C E D and the longitudinal sections F G, in combination with the seat-support $b$ upon the middle section of the axle, whereby the weight of the driver is equalized, and offers no resistance in raising the plow, as and for the purpose specified.

2. The bent axle, as shown and described, in combination with the furrow-wheel A and its spindle-arm L, provided with a bearing for the axle at each end, to adjust the wheel straight from the axle or to provide a crank, as shown and specified.

3. The seat-support $b$, having a loose bearing upon the axle, in combination with the bar V, loop W, cross-bar T, and bent axle, substantially as shown and described.

JESSE H. MOORE.

Witnesses:
WM. H. MOORE,
A. G. MOREY.